(12) United States Patent
King et al.

(10) Patent No.: US 9,355,649 B2
(45) Date of Patent: May 31, 2016

(54) SOUND ALIGNMENT USING TIMING INFORMATION

(71) Applicant: Adobe Systems Incorporated, San Jose, CA (US)

(72) Inventors: Brian John King, Seattle, WA (US); Gautham J. Mysore, San Francisco, CA (US); Paris Smaragdis, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 365 days.

(21) Appl. No.: 13/675,711

(22) Filed: Nov. 13, 2012

(65) Prior Publication Data
US 2014/0135962 A1  May 15, 2014

(51) Int. Cl.
| | |
|---|---|
| G06F 17/00 | (2006.01) |
| G10L 25/48 | (2013.01) |
| G11B 27/10 | (2006.01) |
| G11B 27/28 | (2006.01) |
| H04H 60/04 | (2008.01) |
| H04N 21/439 | (2011.01) |
| H04N 21/422 | (2011.01) |

(52) U.S. Cl.
CPC .............. *G10L 25/48* (2013.01); *G11B 27/10* (2013.01); *G11B 27/28* (2013.01); *H04H 60/04* (2013.01); *H04N 21/4394* (2013.01); *H04N 21/42203* (2013.01)

(58) Field of Classification Search
CPC ........ G10L 25/48; G11B 27/10; G11B 27/28; H04H 60/04; H04N 21/42203; H04N 21/4394
USPC ............................................................ 700/94
See application file for complete search history.

(56) References Cited

U.S. PATENT DOCUMENTS

| | | | |
|---|---|---|---|
| 4,591,928 A | 5/1986 | Bloom et al. | |
| 5,151,998 A | 9/1992 | Capps | |
| 5,351,095 A | 9/1994 | Kerdranvat | |
| 5,652,828 A | 7/1997 | Silverman | |
| 5,671,283 A | 9/1997 | Michener et al. | |
| 5,749,073 A | 5/1998 | Slaney | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 * | 11/2001 | Laroche ......................... | 84/636 |
| 6,333,983 B1 | 12/2001 | Enichen | |
| 6,370,247 B1 | 4/2002 | Takaragi et al. | |
| 6,480,957 B1 | 11/2002 | Liao et al. | |
| 6,778,667 B1 | 8/2004 | Bakhle et al. | |

(Continued)

FOREIGN PATENT DOCUMENTS

WO WO-2010086317 8/2010

OTHER PUBLICATIONS

Adobe Audition Manual: c 2003.*

(Continued)

*Primary Examiner* — Paul McCord
(74) *Attorney, Agent, or Firm* — Wolfe-SBMC

(57) ABSTRACT

Sound alignment techniques that employ timing information are described. In one or more implementations, features and timing information of sound data generated from a first sound signal are identified and used to identify features of sound data generated from a second sound signal. The identified features may then be utilized to align portions of the sound data from the first and second sound signals to each other.

20 Claims, 6 Drawing Sheets

(56) References Cited

U.S. PATENT DOCUMENTS

| | | |
|---|---|---|
| 6,792,113 B1 | 9/2004 | Ansell et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu |
| 7,711,180 B2 | 5/2010 | Ito et al. |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,134,637 B2 | 3/2012 | Rossbach et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,205,148 B1 | 6/2012 | Sharpe et al. |
| 8,245,033 B1 | 8/2012 | Shetty et al. |
| 8,290,294 B2 | 10/2012 | Kopf et al. |
| 8,291,219 B2 | 10/2012 | Eto |
| 8,300,812 B2 | 10/2012 | Van De Ven |
| 8,315,396 B2 * | 11/2012 | Schreiner et al. ............... 381/20 |
| 8,340,461 B2 | 12/2012 | Sun et al. |
| 8,345,976 B2 | 1/2013 | Wang et al. |
| 8,346,751 B1 | 1/2013 | Jin et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 * | 9/2013 | Oh et al. ....................... 704/201 |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,588,551 B2 | 11/2013 | Joshi et al. |
| 8,615,108 B1 | 12/2013 | Stoppa et al. |
| 8,619,082 B1 | 12/2013 | Ciurea et al. |
| 8,675,962 B2 | 3/2014 | Mori et al. |
| 8,694,319 B2 | 4/2014 | Bodin et al. |
| 8,738,633 B1 * | 5/2014 | Sharifi et al. .................. 707/747 |
| 8,751,022 B2 | 6/2014 | Eppolito |
| 8,805,560 B1 * | 8/2014 | Tzanetakis et al. ............ 700/94 |
| 8,855,334 B1 | 10/2014 | Lavine et al. |
| 8,879,731 B2 | 11/2014 | Schultz |
| 8,886,543 B1 * | 11/2014 | Sharifi et al. .................. 704/270 |
| 8,903,088 B2 | 12/2014 | Schultz |
| 8,914,290 B2 | 12/2014 | Hendrickson et al. |
| 8,953,811 B1 * | 2/2015 | Sharifi et al. .................. 381/56 |
| 9,064,318 B2 | 6/2015 | Price et al. |
| 9,076,205 B2 | 7/2015 | Cho et al. |
| 9,135,710 B2 | 9/2015 | Cohen et al. |
| 9,201,580 B2 | 12/2015 | King et al. |
| 9,208,547 B2 | 12/2015 | Cohen et al. |
| 9,214,026 B2 | 12/2015 | Price et al. |
| 2002/0154779 A1 | 10/2002 | Asano et al. |
| 2003/0028380 A1 | 2/2003 | Freeland et al. |
| 2004/0030656 A1 | 2/2004 | Kambayashi et al. |
| 2004/0122662 A1 | 6/2004 | Crockett |
| 2004/0218834 A1 | 11/2004 | Bishop et al. |
| 2004/0254660 A1 * | 12/2004 | Seefeldt ........................ 700/94 |
| 2005/0015343 A1 | 1/2005 | Nagai et al. |
| 2005/0069207 A1 | 3/2005 | Zakrzewski et al. |
| 2005/0198448 A1 | 9/2005 | Fevrier et al. |
| 2005/0201591 A1 | 9/2005 | Kiselewich |
| 2005/0232463 A1 | 10/2005 | Hirvonen et al. |
| 2006/0045211 A1 * | 3/2006 | Oh et al. ........................ 375/329 |
| 2006/0078194 A1 | 4/2006 | Fradkin et al. |
| 2006/0122839 A1 * | 6/2006 | Li-Chun Wang et al. ..... 704/273 |
| 2006/0147087 A1 | 7/2006 | Goncalves et al. |
| 2006/0165240 A1 | 7/2006 | Bloom et al. |
| 2006/0173846 A1 | 8/2006 | Omae et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 * | 4/2007 | Hoffberg ...................... 455/450 |
| 2007/0242900 A1 | 10/2007 | Chen et al. |
| 2007/0291958 A1 * | 12/2007 | Jehan ............................ 381/103 |
| 2008/0120230 A1 | 5/2008 | Lebegue et al. |
| 2008/0278584 A1 | 11/2008 | Shih et al. |
| 2009/0055139 A1 * | 2/2009 | Agarwal et al. ................ 703/2 |
| 2009/0110076 A1 | 4/2009 | Chen |
| 2009/0125726 A1 | 5/2009 | Iyer et al. |
| 2009/0195643 A1 | 8/2009 | Neuman |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0297059 A1 | 12/2009 | Lee et al. |
| 2009/0306972 A1 * | 12/2009 | Opitz et al. .................... 704/203 |
| 2009/0307489 A1 | 12/2009 | Endoh |
| 2009/0315670 A1 | 12/2009 | Naressi et al. |
| 2010/0023864 A1 | 1/2010 | Lengeling et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 * | 8/2010 | Park et al. ...................... 375/219 |
| 2010/0246816 A1 | 9/2010 | Thomas et al. |
| 2010/0257368 A1 | 10/2010 | Yuen |
| 2010/0272311 A1 | 10/2010 | Nir et al. |
| 2010/0279766 A1 | 11/2010 | Pliska et al. |
| 2010/0322042 A1 | 12/2010 | Serletic et al. |
| 2011/0026596 A1 | 2/2011 | Hong |
| 2011/0043603 A1 | 2/2011 | Schechner et al. |
| 2011/0043864 A1 | 2/2011 | Tian et al. |
| 2011/0112670 A1 * | 5/2011 | Disch et al. .................... 700/94 |
| 2011/0131219 A1 | 6/2011 | Martin-Cocher et al. |
| 2011/0161669 A1 | 6/2011 | Eto |
| 2011/0173208 A1 * | 7/2011 | Vogel ............................ 707/746 |
| 2011/0230987 A1 | 9/2011 | Anguera Miró et al. |
| 2011/0261257 A1 | 10/2011 | Terry et al. |
| 2012/0027295 A1 | 2/2012 | Shao |
| 2012/0042167 A1 | 2/2012 | Marking et al. |
| 2012/0046954 A1 * | 2/2012 | Lindahl et al. ................ 704/500 |
| 2012/0056982 A1 | 3/2012 | Katz et al. |
| 2012/0105728 A1 | 5/2012 | Liu |
| 2012/0130822 A1 | 5/2012 | Patwa et al. |
| 2012/0151320 A1 | 6/2012 | McClements, IV |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0127824 A1 | 5/2013 | Cohen |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 * | 7/2013 | Kuntz et al. .................. 704/500 |
| 2013/0191491 A1 | 7/2013 | Kotha et al. |

(56) References Cited

U.S. PATENT DOCUMENTS

| | | |
|---|---|---|
| 2013/0230247 A1 | 9/2013 | Schlosser et al. |
| 2013/0235201 A1 | 9/2013 | Kiyohara et al. |
| 2013/0243313 A1 | 9/2013 | Civit et al. |
| 2013/0243314 A1 | 9/2013 | Civit et al. |
| 2013/0290818 A1* | 10/2013 | Arrasvuori et al. ........... 715/201 |
| 2013/0343606 A1 | 12/2013 | Dal Mutto et al. |
| 2014/0023291 A1 | 1/2014 | Lin |
| 2014/0119643 A1 | 5/2014 | Price |
| 2014/0133675 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0254881 A1 | 9/2014 | Jin |
| 2014/0254882 A1 | 9/2014 | Jin |
| 2014/0254933 A1 | 9/2014 | Jin |
| 2014/0254943 A1 | 9/2014 | Jin |
| 2014/0310006 A1* | 10/2014 | Anguera Miro et al. ..... 704/500 |

OTHER PUBLICATIONS

MPEG-SUrround Specification: c2006.*
Jehan: Creating Music by Listening; c2005.*
Adobe Audition 3.0 User Guide; copyright 2007.*
"Final Office Action", U.S. Appl. No. 13/309,982, (Nov. 1, 2013), 34 pages.
"Final Office Action", U.S. Appl. No. 13/310,032, (Oct. 31, 2013), 21 pages.
Felzenszwalb, Pedro F., et al., "Efficient Belief Propagation for Early Vision", *International Journal of Computer Vision*, 70(1), (2006), pp. 41-54.
Gastal, Eduardo S., et al., "Shared Sampling for Real-Time Alpha Matting", *Eurographics 2010*, vol. 29, No. 2, (2010),10 pages.
He, Kaiming et al., "A Global Sampling Method for Alpha Matting", *CVPR 2011*, (2011), pp. 2049-2056.
Levin, Anat et al., "A Closed Form Solution to Natural Image Matting", *CVPR*, 2006, 8 pages.
Radhakrishnan, Regunathan et al., "A Content-Adaptive Analysis and Representation Framework for Audio Event Discovery from "Unscripted" Multimedia", Hindawi Publishing Corporation, *EURASIP Journal on Applied Signal Processing*, vol. 2006, Article ID 89013, (2006), 24 pages.
Smaragdis, Paris "A Probabilistic Latent Variable Model for Acoustic Modeling", *NIPS*, (2006), 6 pages.
Smaragdis, Paris "Supervised and Semi-Supervised Separation of Sounds from Single-Channel Mixtures", *ICA '07 Proceedings of the 7th international conference on Independent component analysis and signal separation*, (2007), 8 pages.
Smith, Alvy R., et al., "Blue Screen Matting", *SIGGRAPH 96 Conference Proceedings*, (Aug. 1996),10 pages.
Yang, Qingxiong et al., "A Constant-Space Belief Propagation Algorithm for Stereo Matching", *CVPR*, (2010), 8 pages.
"Non-Final Office Action", U.S. Appl. No. 13/309,982, (Jan. 17, 2013), 32 pages.
"Non-Final Office Action", U.S. Appl. No. 13/310,032, (Jan. 3, 2013),18 pages.
"Time Domain Pitch Scaling using Synchronous Overlap and Add", retrieved from <http://homepages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group__PJMED_WSOLA.htm> on Nov. 12, 2012, 4 pages.

De Gotzen, Amalia et al., "Traditional (?) Implementations of a Phase-Vocoder: The Tricks of the Trade", *Proceedings of the COST G-6 Conference on Digital Audio Effects* (DAFX-00), Verona, Italy, Dec. 7-9, 2000, retrieved from <http://128.112.136.35/courses/archives/spring09/cos325/Bernardini.pdf> on Nov. 12, 2012,(Dec. 7, 2000), 7 pages.
Dolson, Mark "The Phase Vocoder: A Tutorial", retrieved from <http://www.panix.com/~jens/pvoc-dolson.par> on Nov. 12, 2012, 11 pages.
Gutierrez-Osuna, Ricardo "L19: Prosodic Modification of Speech", *Lecture based on [Taylor, 2009, ch. 14; Holmes, 2001, ch. 5; Moulines and Charpentier, 1990]*, retrieved from <http://research.cs.tamu.edu/prism/lectures/sp/l19.pdf> on Nov. 12, 2012, 35 pages.
He, et al., "Corner detector based on global and local curvature properties", Retrieved from <http://hub.hku.hk/bistream/10722/57246/1/142282.pdf> on Dec. 21, 2012, (May 2008), 13 pages.
Hirsch, et al., "Fast Removal of Non-uniform Camera Shake", Retrieved from <http://webdav.is.mpg.de/pixel/fast_removal_of_camera_shake/files/Hirsch__ICCV2011__Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Klingbeil, Michael "SPEAR: Sinusoidal Partial Editing Analysis and Resynthesis", retrieved from <http://www.klingbeil.com/spear/> on Nov. 12, 2012, 3 pages.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups/csail.mit.edu/graphics/CodedAperture/CodedAperture-LevineEtAl-SIGGRAPH07.pdf> on Dec. 21, 2012,(2007), 9 pages.
McAulay, R. J., et al. "Speech Processing Based on a Sinusoidal Model", *The Lincoln Laboratory Journal*, vol. 1, No. 2, 1998, retrieved from <http://www.ll.mit.edu/publications/journal/pdf/vol01_no2/1.2.3.speechprocessing.pdf> on Nov. 12, 2012, (1988), pp. 153-168.
Moinet, Alexis et al., "PVSOLA: A Phase Vocoder with Synchronized Overlap-Add", *Proc. of the 14th Int. Conference on Digital Audio Effects* (DAFx-11), Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011), 7 pages.
Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html>on Nov. 12, 2012,(1997), 16 pages.
Roelands, Marc et al., "Waveform Similarity Based Overlap-Add (WSOLA) for Time-Scale Modification of Speech: Structure and Evaluation", retrieved from <http://citeseerx.ist.psu.edu/viewdoc/summary?doi=10.1.1.58.1356> on Nov. 12, 2012, 4 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages
Serra, Xavier "Musical Sound Modeling with Sinusoids Plus Noise", published in C. Roads, S. Pope, A. Picialli, G. De Poli, editors. 1997. *"Musical Signal Processing"*. Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.

(56) References Cited

OTHER PUBLICATIONS

Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012), 15 pages.

Upperman, Gina "Changing Pitch with PSOLA for Voice Conversion", retrieved from <http://cnx.org/content/m12474/latest/?collection=col10379/1.1> on Nov. 12, 2012, 1 page.

Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.

Verhelst, Werner "An Overlap-Add Technique Based on Waveform Similarity (WSOLA) for High Quality Time-Scale Modification of Speech", retrieved from http://citeseerx.ist.psu.edu/viewdoc/download?doi=10.1.1.202.5460&rep=rep1&type=pdf> on Nov. 12, 2012, 4 pages.

Yuan, et al., "Image Deblurring with Blurred/Noisy Image Pairs", *Proceedings of ACM SIGGRAPH*, vol. 26, Issue 3, (Jul. 2007),10 pages.

"Non-Final Office Action", U.S. Appl. No. 13/309,982, Mar. 24, 2014, 35 pages.

"Non-Final Office Action", U.S. Appl. No. 13/310,032, Mar. 7, 2014, 21 pages.

"Non-Final Office Action", U.S. Appl. No. 13/690,755, Mar. 28, 2014, 7 pages.

Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, pp. 337-344.

"Non-Final Office Action", U.S. Appl. No. 13/680,952, Aug. 4, 2014, 8 pages.

"Notice of Allowance", U.S. Appl. No. 13/309,982, Jul. 30, 2014, 6 pages.

"Notice of Allowance", U.S. Appl. No. 13/310,032, Aug. 26, 2014, 6 pages.

"Restriction Requirement", U.S. Appl. No. 13/660,159, Jun. 12, 2014, 6 pages.

"Final Office Action", U.S. Appl. No. 13/690,755, Sep. 10, 2014, 7 pages.

"Non-Final Office Action", U.S. Appl. No. 13/660,159, Oct. 1, 2014, 7 pages.

"Restriction Requirement", U.S. Appl. No. 13/722,825, Oct. 9, 2014, 7 pages.

"Supplemental Notice of Allowance", U.S. Appl. No. 13/310,032, Nov. 3, 2014, 4 pages.

Zhu, et al., "Fusion of Time-of-Flight Depth and Stereo for High Accuracy Depth Maps", IEEE Conference on Computer Vision and Pattern Recognition, Jun. 23, 2008, 8 pages.

"Non-Final Office Action", U.S. Appl. No. 13/675,807, Dec. 17, 2014, 18 pages.

"Non-Final Office Action", U.S. Appl. No. 13/675,844, Dec. 19, 2014, 10 pages.

"Non-Final Office Action", U.S. Appl. No. 13/681,643, Jan. 7, 2015, 10 pages.

"Non-Final Office Action", U.S. Appl. No. 13/688,421, Feb. 4, 2015, 18 pages.

"Non-Final Office Action", U.S. Appl. No. 13/794,125, Oct. 24, 2014, 19 pages.

"Non-Final Office Action", U.S. Appl. No. 13/794,219, Feb. 12, 2015, 28 pages.

"Non-Final Office Action", U.S. Appl. No. 13/794,408, Sep. 10, 2014, 14 pages.

"Notice of Allowance", U.S. Appl. No. 13/794,125, Jan. 30, 2015, 7 pages.

"Notice of Allowance", U.S. Appl. No. 13/794,408, Feb. 4, 2015, 7 pages.

"Restriction Requirement", U.S. Appl. No. 13/690,724, Feb. 26, 2015, 6 Pages.

"Sound Event Recognition With Probabilistic Distance SVMs", IEEE TASLP 19(6), 2011.

Barnes, et al., "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.

Barnes, et al., "The Generalized PatchMatch Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010, 14 pages.

Brox, et al., "Large Displacement Optical Flow: Descriptor Matching in Variational Motion Estimation", IEEE Transactions on Pattern Analysis and Machine Intelligence, 2010, 2011, 14 pages.

Dong, et al., "Adaptive Object Detection and Visibility Improvement in Foggy Image", Journal of Multimedia, vol. 6, No. 1 (2011), Feb. 14, 2011, 8 pages.

Fattal, "Single Image Dehazing", presented at the ACM SIGGRAPH, Los Angeles, California, 2008., 9 pages.

He, et al., "Computing Nearest-Neighbor Fields via Propagation-Assisted KD-Trees", CVPR 2012, 8 pages.

He, et al., "Single Image Haze Removal Using Dark Channel Prior", In Computer Vision and Pattern Recognition, IEEE Conference on, 2009, 8 pages.

He, et al., "Statistics of Patch Offsets for Image Completion", ECCV 2012, 14 pages.

Korman, et al., "Coherency Sensitive Hashing", ICCV 2011, 8 pages.

Li, et al., "Instructional Video Content Analysis Using Audio Information", IEEE TASLP 14(6), 2006.

Olonetsky, et al., "TreeCANN—k-d tree Coherence Approximate Nearest Neighbor algorithm", European Conference on Computer Vision, 2012, 14 pages.

Park, et al., "Extracting Salient Keywords from Instructional Videos Using Joint Text, Audio and Visual Cues", Proceedings of the Human Language Technology Conference of the North American Chapter of the ACL, Association for Computational Linguistics, Jun. 2006, pp. 109-112.

Wu, "Fish Detection in Underwater Video of Benthic Habitats in Virgin Islands", University of Miami, May 29, 2012, 72 pages.

Xu, et al., "Motion Detail Preserving Optical Flow Estimation", IEEE Transactions on Pattern Analysis and Machine Intelligence, 34(9), 2012, 8 pages.

Zhang, et al., "Video Dehazing with Spatial and Temporal Coherence", The Visual Computer: International Journal of Computer Graphics—CGI'2011 Conference, vol. 27, Issue 6-8, Apr. 20, 2011, 9 pages.

"Corrected Notice of Allowance", U.S. Appl. No. 13/660,159, Apr. 28, 2015, 2 pages.

"Corrected Notice of Allowance", U.S. Appl. No. 13/660,159, May 29, 2015, 2 pages.

"Final Office Action", U.S. Appl. No. 13/675,807, May 22, 2015, 24 pages.

"Final Office Action", U.S. Appl. No. 13/681,643, May 5, 2015, 14 pages.

"Non-Final Office Action", U.S. Appl. No. 13/690,755, Mar. 2, 2015, 8 pages.

"Non-Final Office Action", U.S. Appl. No. 13/720,258, Mar. 3, 2015, 14 pages.

"Non-Final Office Action", U.S. Appl. No. 13/722,825, Mar. 25, 2015, 17 pages.

"Notice of Allowance", U.S. Appl. No. 13/660,159, Mar. 10, 2015, 6 pages.

"Notice of Allowance", U.S. Appl. No. 13/680,952, Mar. 17, 2015, 6 pages.

Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.

Yang,"Stereo Matching with Color-Weighted Correlation, Hierarchical Belief Propagation, and Occlusion Handling", IEEE Transactions on Pattern Analysis and Machine Intelligence , vol. 31 Issue 3, Mar. 2009, 13 pages.

"Corrected Notice of Allowance", U.S. Appl. No. 13/722,825, Sep. 21, 2015, 4 pages.

"First Action Interview Office Action", U.S. Appl. No. 13/720,316, Oct. 22, 2015, 4 pages.

(56) References Cited

OTHER PUBLICATIONS

"Non-Final Office Action", U.S. Appl. No. 13/681,643, Oct. 16, 2015, 27 pages.
"Notice of Allowance", U.S. Appl. No. 13/720,258, Sep. 18, 2015, 2 pages.
"Notice of Allowance", U.S. Appl. No. 13/722,825, Aug. 28, 2015, 10 pages.
"Final Office Action", U.S. Appl. No. 13/675,844, Aug. 14, 2015, 17 pages.
"Final Office Action", U.S. Appl. No. 13/688,421, Jul. 29, 2015, 22 pages.
"Supplemental Notice of Allowance", U.S. Appl. No. 13/680,952, Jun. 11, 2015, 3 pages.
"Pre-Interview Communication", U.S. Appl. No. 13/720,316, Aug. 5, 2015, 3 pages.
"Supplemental Notice of Allowance", U.S. Appl. No. 13/690,755, Aug. 18, 2015, 4 pages.
"Notice of Allowance", U.S. Appl. No. 13/690,755, Jun. 5, 2015, 6 pages.
"Notice of Allowance", U.S. Appl. No. 13/675,807, Aug. 27, 2015, 6 pages.
"Non-Final Office Action", U.S. Appl. No. 13/690,724, Jun. 18, 2015, 7 pages.
"Notice of Allowance", U.S. Appl. No. 13/720,258, Jul. 24, 2015, 8 pages.
Dueck, "Non-metric Affinity Propagation for Unsupervised Image Categorization", IEEE 11th International Conference on Computer Vision, Oct. 14, 2007, 8 pages.
Xiao, "Joint Affinity Propagation for Multiple View Segmentation", IEEE 11th International Conference on Computer Vision, Oct. 14, 2007, 7 pages.
"Corrected Notice of Allowance", U.S. Appl. No. 13/720,258, Nov. 13, 2015, 2 pages.
"Corrected Notice of Allowance", U.S. Appl. No. 13/722,825, Nov. 16, 2015, 4 pages.
"Final Office Action", U.S. Appl. No. 13/690,724, Dec. 10, 2015, 11 pages.
"Non-Final Office Action", U.S. Appl. No. 13/688,421, Jan. 7, 2016, 20 pages.
"Non-Final Office Action", U.S. Appl. No. 13/690,724, Apr. 5, 2016, 11 pages.
"Non-Final Office Action", U.S. Appl. No. 13/720,316, Apr. 8, 2016, 14 pages.
"Non-Final Office Action", U.S. Appl. No. 13/675,844, Feb. 12, 2016, 17 pages.
"Final Office Action", U.S. Appl. No. 13/681,643, Mar. 15, 2016, 25 pages.
"Sonar X1", Sonar, 2010, pp. 573, 595-599.

\* cited by examiner

400

402
Identify features and timing information of sound data generated from a first sound signal 404
Features of the sound data generated from the first sound signal include bases that describe spectral characteristics of the sound data and weights that describe temporal features of the sound data 406
Timing information is computed as a cross-correlation of the weights for different frames in the sound data generated from the first sound signal 408
Identify features of sound data generated from a second sound signal using the identified features and timing information of the sound data generated from the first sound signal 410
Estimate a new set of weights for the features of the sound data generated from the second sound signal using an estimate of weights along with the timing information

*Fig. 4*

SOUND ALIGNMENT USING TIMING INFORMATION

BACKGROUND

Sound alignment may be leveraged to support a wide range of functionality. For example, sound data may be captured for use as part of a movie, recording of a song, and so on. Parts of the sound data, however, may reflect capture in a noisy environment. Therefore, noise may interfere with consumption of desired parts of the sound data, such as to understand a speaker in a lecture, a band in a live concert, and so forth. Accordingly, parts of the sound data may be replaced by other sound data using sound alignment. Sound alignment may also be employed to support other functionality, such as to utilize a foreign overdub to replace the sound data with dialog in a different language.

However, conventional techniques that are employed to automatically align the sound data may prove inadequate when confronted with noise. Accordingly, the inadequacies of these conventional techniques may cause a user to forgo use of the techniques. This may force users to undertake multiple re-recordings of the sound data that is to be used as a replacement until a desired match is obtained, manual fixing of the timing by a sound engineer, and so on.

SUMMARY

Sound alignment techniques that employ timing information are described. In one or more implementations, features and timing information of sound data generated from a first sound signal are identified and used to identify features of sound data generated from a second sound signal. The identified features may then be utilized to align portions of the sound data from the first and second sound signals to each other.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure in an example implementation in which features and timing information identified from sound data of a first sound signal are used to identify features from sound data of a second sound signal.

DETAILED DESCRIPTION

Overview

Sound alignment techniques may be employed to support a variety of different functionality. For example, sound data having a higher quality may be synchronized with sound data having a lower quality to replace the lower quality sound data, such as to remove noise from a video shoot, music recording, and so on. In another example, a foreign overdub may be used to replace original sound data for a movie with dialog in a different language. However, conventional auto-alignment systems may not be robust to noise, examples of which include use of dynamic time warping and hidden Markov models. This may be due to a variety of different complications, such as distortion of Mel-frequency cepstral coefficient (MFCC) values by the noise such that the values become indistinguishable from each other. Accordingly, conventional sound alignment techniques were not utilized in such situations as previously described.

Sound alignment techniques that involve use of timing information are described herein. In one or more implementations, features and timing information are extracted from overdub sound data that is to be used to replace at least part of reference sound data. The reference sound data, for instance, may have been recorded in a noisy environment. Accordingly, overdub sound data may be captured to replace at least parts of the reference sound data, such as to have an actor repeat portions of the dialog. Other examples are also contemplated, such as use of a foreign overdub.

The identified features and timing information from the overdub sound data may then be used to process the reference sound data to identify similar features based on the timing information. In this way, this processing may be performed by having an idea of "where to look" for the features based on the timing information and thus may improve accuracy as well as efficiency in processing of the data. Additional discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
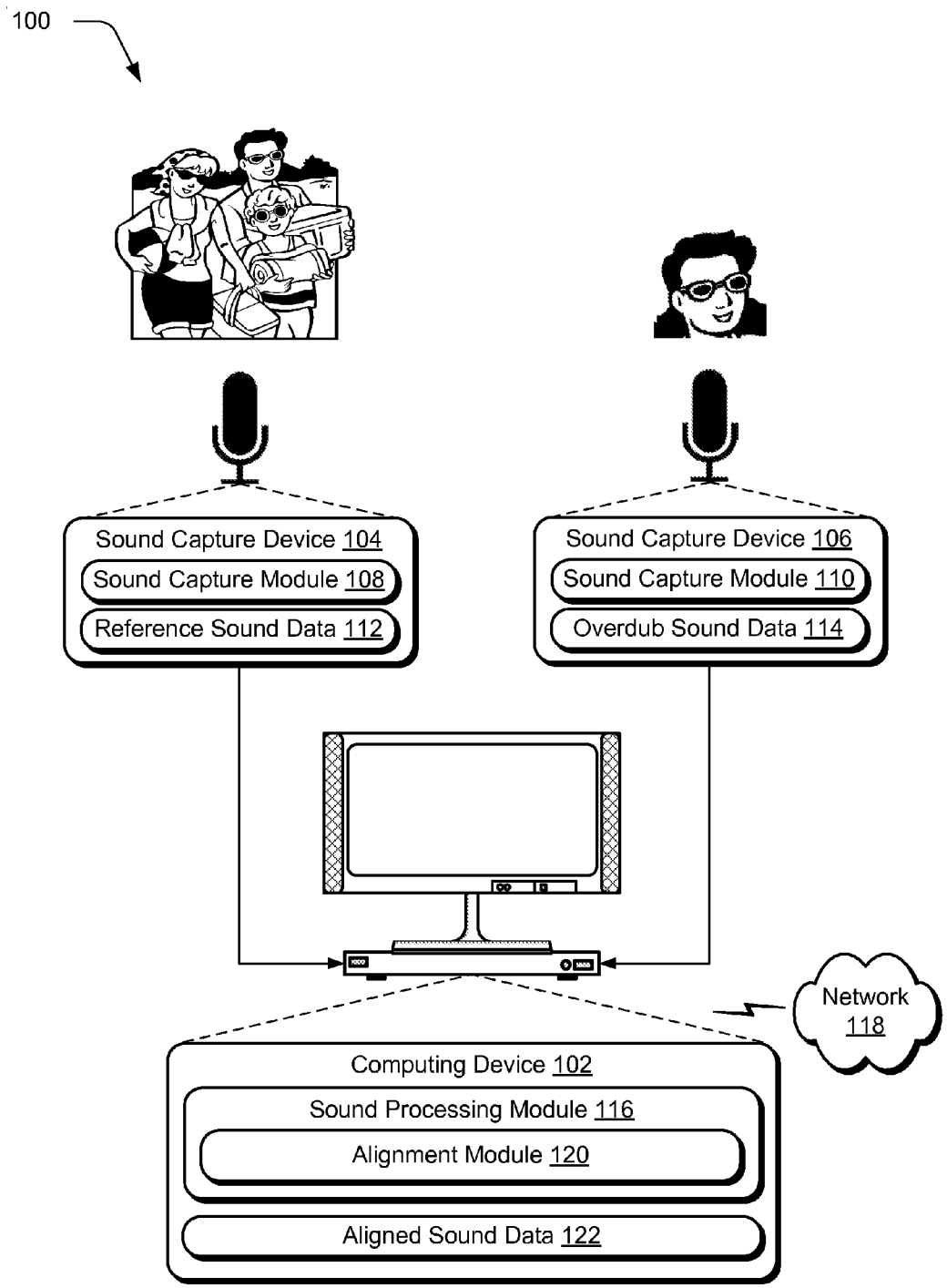
FIG. 1 is an illustration of an environment in an example implementation that is operable to employ identification and alignment techniques as described herein.

FIG. 1 is an illustration of an environment 100 in an example implementation that is operable to employ techniques described herein. The illustrated environment 100 includes a computing device 102 and sound capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 6.

The sound capture devices 104, 106 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture devices 104, 106 are illustrated separately from the computing device 102, the sound capture devices 104, 106 may be configured as part of the computing device 102, a single sound capture device may be utilized in each instance, and so on.

The sound capture devices 104, 106 are each illustrated as including respective sound capture modules 108, 110 that are representative of functionality to generate sound data, examples of which include reference sound data 112 and overdub sound data 114. Reference sound data 112 is utilized to describe sound data for which at least a part is to be replaced by the overdub sound data 114. This may include replacement of noisy portions (e.g., due to capture of the reference sound data 112 "outside"), use of a foreign overdub, and so on. Thus, the overdub sound data 114 may reference unaligned sound data that is to be processed for alignment with the reference sound data 112. Accordingly, although illustrated separately for clarity in the discussion it should be apparent that these roles may be satisfied alternately by different collections of sound data (e.g., in which different parts are taken from two or more files), and so on.

Regardless of where the reference sound data 112 and overdub sound data 114 originated, this data may then be obtained by the computing device 102 for processing by a sound processing module 116. Although illustrated as part of the computing device 102, functionality represented by the sound processing module 116 may be further divided, such as to be performed "over the cloud" via a network 118 connection, further discussion of which may be found in relation to FIG. 6.

An example of functionality of the sound processing module 116 is represented as an alignment module 120. The alignment module 120 is representative of functionality to align the overdub sound data 114 to the reference sound data 112 to create aligned sound data 122. As previously described, this may be used to replace noisy portion of sound data, replace dialog with other dialog (e.g., for different languages), and so forth. Further discussion of generation of the aligned sound data 122 may be found in the following discussion and associated figure.

Figure 2:
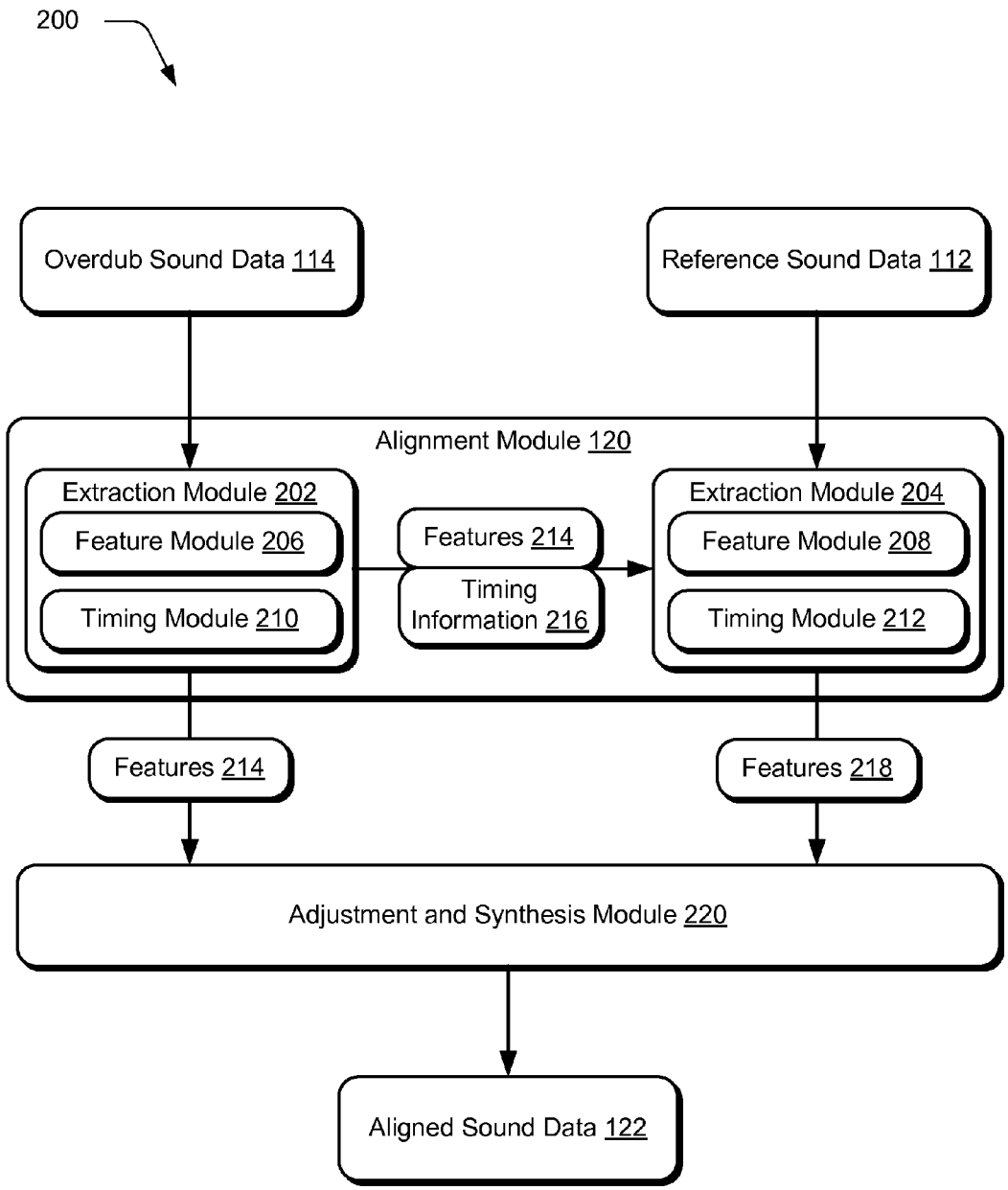
FIG. 2 depicts a system in an example implementation in which aligned sound data is generated from overdub sound data and reference sound data of FIG. 1.

FIG. 2 depicts a system 200 in an example implementation in which aligned sound data 122 is generated from overdub sound data 114 and reference sound data 112 from FIG. 1. Overdub sound data 114 and reference sound data 112 are illustrated as being received for processing by respective extraction modules 202, 204 of the alignment module 120. Although illustrated separately, a single extraction module may also be utilized for processing both the overdub sound data 114 and the reference sound data 112.

The extraction modules 202, 204 are each illustrated as including a respective feature module 206, 208. The feature modules 206, 208 are representative of functionality to identify features in the sound data that are usable to uniquely identify particular portions of the sound data. An example of one such feature includes speech characteristics of utterances made by one or more users, although other examples are also contemplated as further described in relation to FIG. 3.

The extraction modules 202, 204 are also illustrated as including timing modules 210, 212, respectively. The timing modules 210, 212 are representative of functionality to identify timing information 214 for respective features 216 as well as to locate features 214 based at least in part on the timing information 216.

For example, the overdub sound data 114 may be processed by the feature module 206 to identify features 214 and the timing module 210 to identify timing information 216 for those features. The identified features 214 and the timing information 216 may then be passed to the extraction module 204 to process the reference sound data 112. In this way, the feature module 208 and the timing module 212 may leverage the prior knowledge provided by the identification of the features 214 and timing information 216 from the overdub sound data 114 to locate features 218 in the reference sound data 112.

The features identified in the overdub sound data 114 and the features 218 identified from the reference sound data 112 may then be used by a synthesis module 220 to generate aligned sound data 112. This may include "speeding up" and "slowing down" portions of the overdub sound data 114 to match feature timing in the reference sound data 112. Feature identification and timing information extraction may be performed in a variety of ways, an example of which is described as follows and shown in an associated figure.

Figure 3:
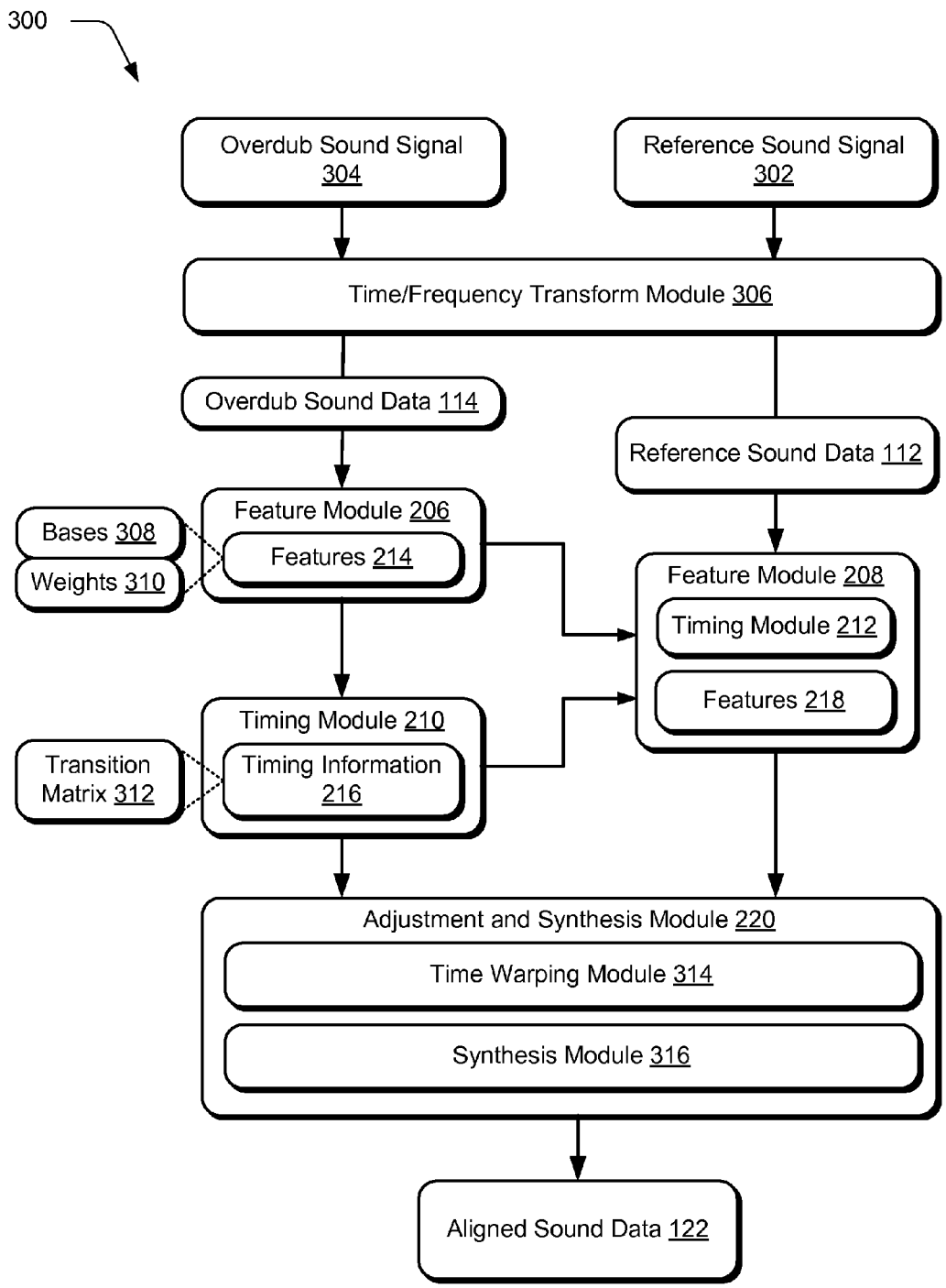
FIG. 3 depicts a system in an example implementation in which features and timing information are utilized to generate aligned sound data.

FIG. 3 depicts a system 300 in an example implementation in which features and timing information are utilized to generate aligned sound data. A reference sound signal 302 and an overdub sound signal 304 are processed by a time/frequency transform module 306 to create reference sound data 112 and overdub sound data 114, which may be configured in a variety of ways. The sound data, for instance, may form one or more spectrograms of a signal of a respective signal. For example, a time-domain signal may be received and processed to produce a time-frequency representation, e.g., a spectrogram. Thus, the reference sound data 112 and overdub sound data 114 provide a time-frequency representation of the reference sound signal 302 and overdub sound signal 304, respectively, in this example.

Spectrograms, for instance, may be generated as magnitudes of short time Fourier transforms (STFT) of the signals. The spectrograms may assume a variety of configurations, such as narrowband spectrograms (e.g., 32 ms windows) although other instances are also contemplated. The STFT subbands may be combined in a way so as to approximate logarithmically-spaced and other nonlinearly-spaced subbands. In doing so, potentially adverse effects (e.g., very dissimilar features) from differences in pitch between the two sound recordings may be mitigated and small differences in pitch may not result in significant differences in features, e.g., spectral basis vectors, weights. In various embodiments, STFTs and subband representations may be calculated for each of the reference sound signal 302 and overdub sound signal 304 before computing respective features, although other implementations are also contemplated.

The overdub sound data 114 is then received by a feature module 206 to identify features 214 that are usable to identify particular parts of the overdub sound data 114 for alignment purposes. This may include calculation of bases 308 (e.g., spectral characteristics) and weights 310 (e.g., temporal features) of the overdub sound data 114. For example, features 214 may include spectral features such as spectral basis vectors, which may be spectral building blocks of the sound data. Features 214 may also include weights 310 involving temporal features, such as speech weights, noise weights, and so on. The weights may define a temporal evolution of a signal such that at each time instance of the signal, the signal may be defined by a linear combination of the blocks.

The feature module 206 may employ a variety of different techniques to compute the features 214. For example, the features 214 may be computed with an algorithm, such as Probabilistic Latent Component Analysis (PLCA), nonnegative matrix factorization (NMF), nonnegative hidden Markov (N-HMM), nonnegative factorial hidden Markov (N-FHMM), and the like.

In PLCA, for instance, "$N_{speech}$" speech basis vectors and weights may be computed. PLCA may be used to model data (e.g., a sound recording) as a multidimensional joint probability distribution. Consider a time-frequency distribution of the source being modeled (e.g., non-stationary noise) "$P_r(f,t)$" where "f" is frequency and "t" is time. Intuitively, the PLCA model may operate on the spectrogram representation of the audio data and may learn an additive set of basis functions that represent each of the potential spectral profiles expected from a sound. For example, the observed time-frequency magnitude distribution "P(f,t)" may be expressed as a normalized magnitude spectrogram of a signal as follows:

$$X_N(f,t) \approx P(f,t) = \sum_{z=1}^{N} P(t)P(z|t)P(f|z),$$

where $$X_N(f,t) = \frac{|X(f,t)|}{\sum_{f,t} |X(f,t)|}$$

with "X(f,t)" being a short-time Fourier transform of a signal and "$X_N(f,t)$" being the normalized STFT. PLCA may then enable the hidden, or latent, components of the data to be modeled as the three distributions as follows:

"P(f|z)" corresponds to the spectral building blocks, or basis vectors, of a signal;
"P(z|t)" corresponds to how a weighted combination of these basis vectors may be combined at each time "t" to approximate an observed signal;
P(z) corresponds to the relative contribution of each base to the entire observed signal.

Each distribution may be discrete.

Given a spectrogram, model parameters may be estimated using an expectation-maximization (EM) algorithm. In one or more implementations that employ PLCA, each of the components is implicitly nonnegative through modeling as distributions. Accordingly, by using nonnegative components, the components may all be additive, which can result in more intuitive models. Prior knowledge of the signal may be used, such as incorporating entropic priors for sparsity, and adding temporal coherence through hidden Markov models. As described herein, other models may also be used. For example, non-probabilistic models, such as non-negative matrix factorization (NMF), the nonnegative hidden Markov model (N-HMM), and the nonnegative factorial hidden Markov model (N-FHMM) may also be used. Although described in terms of PLCA, other techniques may also be employed by the system 300, such as to employ an NMF, N-HMM, or N-FHMM framework.

As previously described, overdub sound data 114 may be represented using a spectrogram (e.g., magnitude subband representation), which may be calculated from the overdub sound signal 304. PLCA may then be performed on the spectrogram of the overdub sound data 114. A feature vector "$F_u$" for the overdub sound data 114 may be constructed as follows:

$$F_u(z,t) = P_u(z,t) = P_u(z|t)P_u(t), \text{ for } z \in Z_u$$

where "$Z_u$" is a set of bases 308 (e.g., speech basis vectors) learned in the overdub sound data 114, e.g., the unaligned signal. "$F_u$" may be thought of as a matrix of values that indicate how the speech basis vectors may be linearly combined to approximate an observed signal. The speech basis vectors learned from overdub sound data 114 may be reused as the speech basis vectors for processing the reference sound data 1122 by the feature module 208 to arrive at features 218 as further described below.

The timing module 210 may also be used to compute timing information 216 as previously described. In this example, the timing information 216 is configured as a transition matrix 312 of the weights 310. This is performed by computing a cross-correlation of the weights 310, such as a correlation of the "n-th" frame's weights with the weights in the "n+1-th" frame for each of the frames in the overdub sound data 114.

Outputs of the feature module 206 and timing module 210 may then be provided to the feature module 208 for processing of the reference sound data 112. The reference sound data 112, for instance, may be a recording of the same speaker from the overdub sound data 114 (e.g., a same actor/actress), the same musical instrument, a different speaker (e.g., foreign language recording, two different singers each singing the same song), a different musical instrument (e.g., playing the same song as the musical instrument from the overdub sound signal 304), or a same or different musical performer, and so on.

As previously described, the reference sound data 112 may also be configured as a time-frequency representation, such as a spectrogram. The reference sound data 112 may then be processed by the feature module 208 to arrive at a collection of features 218. However, the feature module 208 may also leverage the features 214 and timing information 216 generated by the feature module 206 and timing module 210 from the overdub sound data 114.

For example, the feature module 208 may employ PLCA or another technique to compute weights using the bases 208 of the overdub sound data 114. Additional bases may be added in order to account for and estimate noise. In this case, the bases for the noise and the weights for both speech and noise are estimated, with the bases for the speech fixed. The weights corresponding to the speech are used as the features 218 for the reference sound data 112.

The feature module 208 may also employ an output of the timing module 210 in the identification of the features 218 by using timing module 212. In each iteration, after each initial guess of the weights is performed by the feature module 208, that guess and the transition matrix are used to estimate a new set of weights.

The feature module 208, for instance, may employ the PLCA algorithm such that an update of the noise basis vectors is allowed to adapt to the noise but the speech basis vectors are kept constant. For example, the features of the second signal may be computed using the following expression:

$$F_u(z,t) = P_u(z,t) = P_u(z|t)P_u(t), \text{ for } z \in Z_u$$

Thus, as before this technique may be employed to address a "noisy" signal.

In addition to performing well where the reference sound data 112 contains noise, these techniques may be adjusted when the reference sound data 112 has little to no noise. For instance, if it is known that the reference sound data 112 has little to no noise, PLCA may be performed to find a new "$P_r(t)$" and "$P_r(z|t)$" with the "$P(f|z)$" basis vectors learned from the overdub sound data 114. The reference features may then be computed similarly resulting in "$P_r(z,t)$." Because the same basis set may be used for both the overdub sound data 114 and the reference sound data 112, parts of audio similar in the second signal may have values of "$P_r(z|t)$" similar to the values of "$P_u(z|t)$." Thus, the features learned from the both sets of sound data may correspond to the same sounds because they share the same speech basis. Moreover, if the vocal characteristics between the set of data are similar, the features of the corresponding parts of dialogue may match closely and result in accurate alignment.

In some implementations, enhanced reference sound data may be synthesized by performing semi-supervised source separation based on the speech basis vectors and weights. In such implementations, features for the enhanced reference sound data may be computed based on the computed features 214 from the overdub sound data 114, or in other instances, independently without using the computed features 214. Additionally, independent computation of features may also be performed using algorithms other than PLCA.

Aligned sound data 122 may then be generated based on the features output for the overdub sound data 114 and the reference sound data 112. An adjustment and synthesis module 220, for instance, may be used to time align a temporal portion of the features 214 of the overdub sound data 114 with a temporal portion of the features 218 of the reference sound data. For example, the features 214, 218 may each include matrices of speech weights for the overdub sound data 114 and the reference sound data 112, respectively. Basis vectors and noise weights may be discarded. The features 214, 218 may be used to analyze how the overdub sound signal 304 may be warped in time by the time warping module 314 to align the respective features, such as by a global offset or sampling factor, compressing, stretching, and so on.

The time warping module 314, for instance, may employ dynamic time warping that leverages a similarity matrix of the reference and overdub features, respectively. The similarity matrix may be configured in a variety of ways, such as a two-dimensional rectangular matrix. One dimension may express length, in number of windows, for the reference sound data 112 and the other dimension may be the length for the overdub sound data 114. Each element of the matrix may give a distance between features, such as the cosine distance.

An optimal path may then be determined to minimize the error between the features of the reference sound data 112 and overdub sound data 114, respectively, such that the path is most similar in the most number of planes. For instance, a path may indicate that to align a given frame of the reference sound data 112 and overdub sound data 114, the reference sound data 112 and the overdub sound data 114 are each to be advanced by a single frame. For another frame, a path may indicate that the reference sound data 112 is to be advanced two frames and the overdub sound signal 304 is to remain on a current frame, i.e., is not to be advanced. The paths may indicate whether to stretch, compress, time-shift, or otherwise warp one of the signals to better match the other signal.

In some embodiments, the similarity matrix may calculate the cosine distance of the reference and unaligned feature vectors (e.g., temporal speech weights) at each time window as follows:

$$S(F_r(t_a), F_u(t_b)) = \cos(\theta) = \frac{F_r(t_a) \cdot F_u(t_b)}{\|F_r(t_a)\| \|F_u(t_b)\|}$$

where $$S \in [-1, 1]^{T_r, T_u}$$

"$T_r$" and "$T_u$" may be the number of windows in time of the reference and overdub sound data 112, 114. The measure may be invariant to scaling with a non-negative value. Additionally, the two signals may match well even if the two signals have different amplitude but similar spectral characteristics. The time warping module 314 may use the similarity matrix to calculate the path through the matrix that results in the highest similarity score, and thus the similarity matrix may exhibit a proper path for alignment. A synthesis module 316 may then leverage an output of the time warping module 314 to generate aligned sound data 112 using the overdub sound data 114 and the reference sound data 112.

As previously described the overdub sound data 114 may be configured in a variety of ways. For instance, in a foreign dubbing embodiment, the system 300 may allow for the audio in one signal to more closely follow the other signal (e.g., second signal, reference signal) such that utterances or other audio overlap more closely. For example, certain audio features from the two signals may be stretched, compressed, or shifted such that the lengths of those features are same and overlap in time. As another example, consider a scenario in which two saxophones in a musical performance are off in timing. The system 300 may be used to automatically align the signals from the two saxophones to be more closely synchronized.

Additionally, the techniques employed by the system 300 of FIG. 3 may be used in situations in which both signals are noisy, in situations in which speakers from the two signals have significantly different spectral characteristics, and so on. For example, frequency shift-invariant basis vectors may be utilized by incorporating shift-invariant PLCA.

Further, accuracy in the analysis of noisy reference sound data 112 may be increased by using knowledge of similarities with another signal through machine learning. Further, by exploiting knowledge of the other signal in analyzing the noise, introduction of artifacts at the feature computation level may be minimized. Moreover, by modeling the noise of the noisy reference signal separately, alignment to a high fidelity unaligned signal may be performed with increased accuracy.

Example Procedures

The following discussion describes timing information techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

FIG. 4 depicts a procedure 400 in an example implementation in which features and timing information identified from sound data of a first sound signal are used to identify features from sound data of a second sound signal. Features and timing information are identified of sound data generated from a first sound signal (block 402). The features, for instance, may be utilized to uniquely identify particular portions of the sound data and the timing information may help define where those features were found, temporally.

For example, features of the sound data generation from the first sound signal may include bases that describe spectral characteristics of the sound data and weights that describe temporal features of the sound data (block 404). Additionally, timing information may be computed as a cross-correlation of the weights for different frames in the sound data generated from the first sound signal (block 406).

Features of sound data generated from a second sound signal are identified using the identified features and timing information of the sound data generated from the first sound signal (block 408). For example, a new set of weights may be estimated for the features of the sound data generated from the second sound signal using an estimate of weights along with the timing information (block 410). In this way, the timing information may aid in locating the features by knowing "where to look" for the features as further described above.

Figure 5:
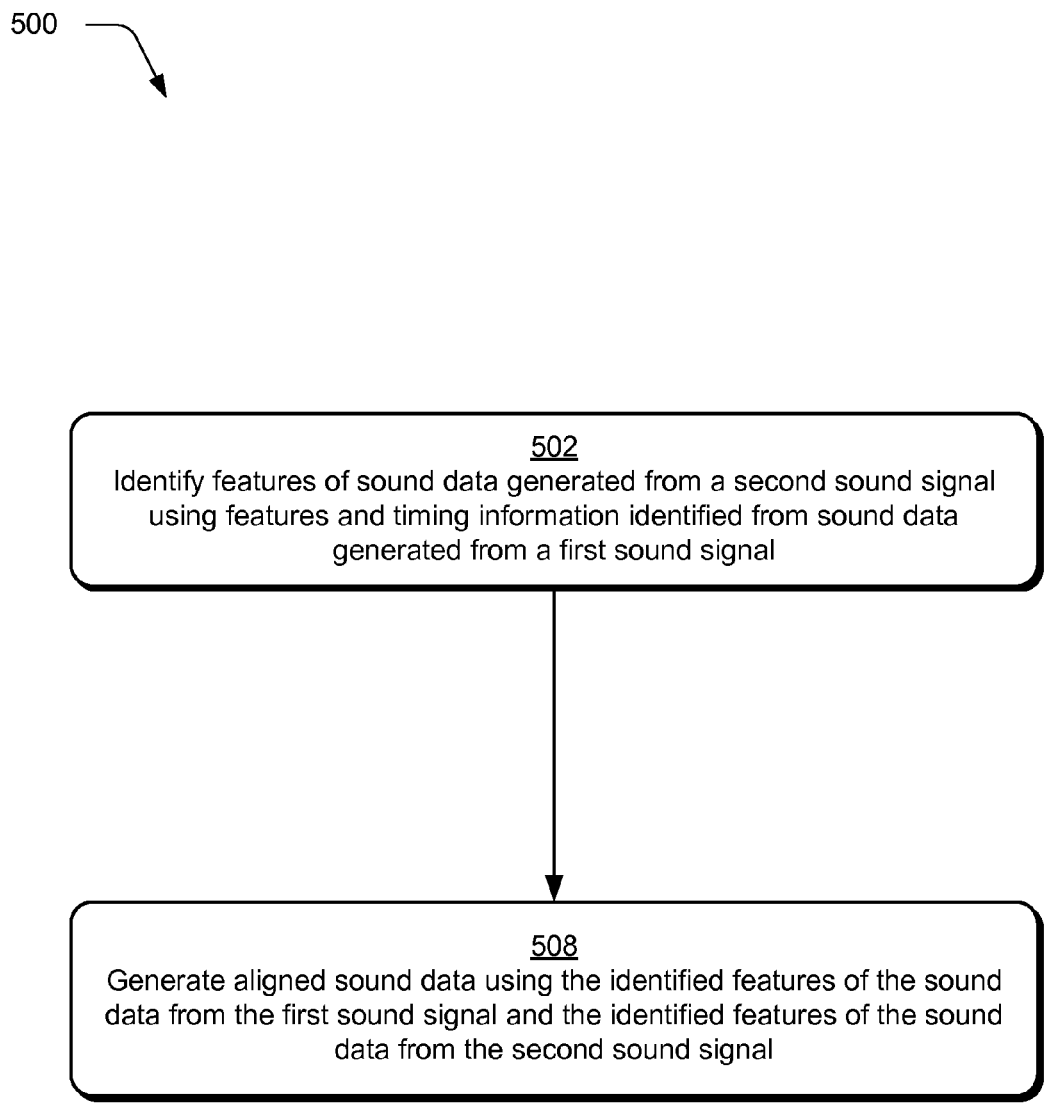
FIG. 5 is a flow diagram depicting a procedure in an example implementation in which features are identified and used to align sound data.

FIG. 5 depicts a procedure 500 in an example implementation in which features are identified and used to align sound data. Features of sound data are identified that was generated from a second sound signal using features and timing information identified from sound data generated from a first sound signal (block 502). For example, the first sound signal may be configured as an overdub sound signal 304 that is to be used to replace at least a portion of a reference sound signal 302. Thus, features and timing information located for the overdub sound data 114 may be utilized to locate features in the reference sound data 112. As described previously, the overdub sound data 114 may be configured in a variety of different ways, such as a foreign overdub, different instrument, or originate from any other sound signal.

Aligned sound data is generated using the identified features of the sound data from the first sound signal and the identified features of the sound data from the second sound signal (block 508). The alignment may involve stretching and/or compressing portions of the sound data for the first or second sound signals to align the features, an example of which is dynamic time warping. Other examples are also contemplated without departing from the spirit and scope thereof.

Example System and Device

Figure 6:
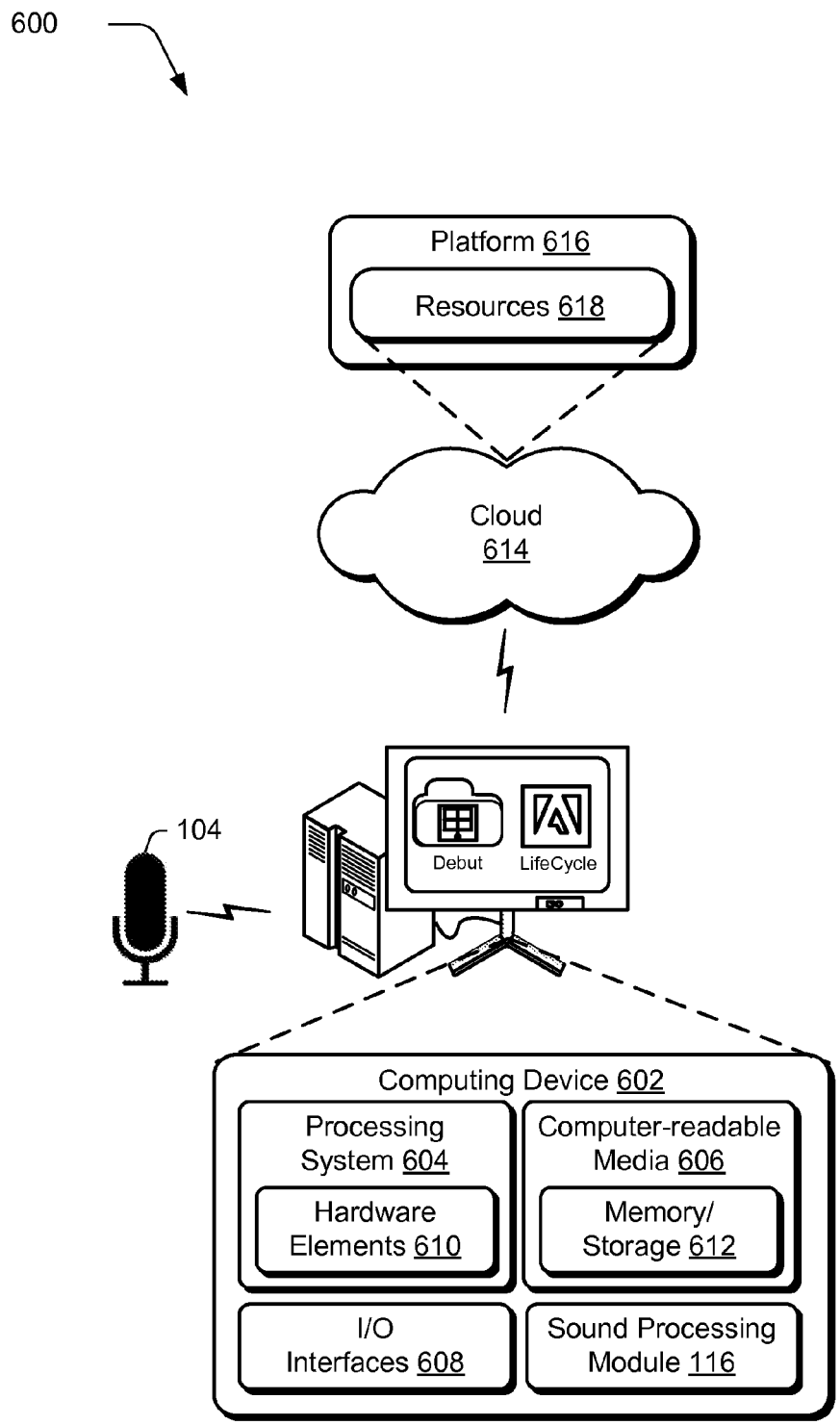
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the sound processing module 116, which may be configured to process sound data, such as sound data captured by an sound capture device 104. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
    identifying features of first sound data generated from a first sound signal using a feature module, the features including bases that describe spectral characteristics of the first sound data and weights that describe temporal features of the first sound data;
    identifying timing information of the first sound data using a timing module, the timing information being a cross-correlation of the weights for different frames of the first sound data;
    estimating parameters of the features and the timing information of the first sound data;
    processing second sound data generated from a second sound signal to identify second features and second timing information of the second sound data that are within the estimated parameters of the first sound data;
    extracting the identified features of the first sound data;
    inserting the extracted identified features of the first sound data into the second sound data based on the second features and second timing information of the second sound data, the inserting effective to provide altered second sound data; and producing the altered second sound data with the extracted identified features of the first sound data.

2. A method as described in claim 1, wherein the timing information is expressed using a transition matrix that is computed as the cross-correlation of the weights for different frames in the first sound data generated from the first sound signal.

3. A method as described in claim 1, wherein the processing of the second sound data generated from the second sound signal is performed iteratively by estimating a new set of weights for the first features of the first sound data generated from the first sound signal.

4. A system comprising:
   at least one extraction module implemented at least partially in hardware and configured to process sound data generated from a first and a second sound signal and identify features and timing information common to the first and second sound signals, the identification of features and timing information based on an estimated set of parameters for the features and timing information of the sound data generated from the first sound signal;
   the features including bases that describe spectral characteristics of the sound data and weights that describe temporal features of the sound data;
   the timing information being a cross-correlation of the weights for different frames of the sound data; and
   one or more modules implemented at least partially in hardware and configured to extract the identified features of the sound data from the first sound signal and insert the identified features of the sound data from the first sound signal into the second sound signal to produce altered sound data from the second sound signal with the identified features of the first sound signal.

5. A system as described in claim 4, wherein the timing information is expressed using a transition matrix that is computed as a cross-correlation of the weights for different frames in the sound data generated from the first sound signal.

6. A system as described in claim 4, wherein the at least one extraction module is further configured to estimate the set of parameters for the features and timing information of the sound data generated from the first sound signal and iteratively narrow the set of parameters to identify corresponding features of the sound data generated from the second sound signal.

7. One or more computer-readable and non-transitory storage media having instructions stored thereon that, responsive to execution on a computing device, causes the computing device to perform operations comprising:
   identifying features and timing information of sound data of a first sound signal, the identified features including bases that describe spectral characteristics of the sound data and weights that describe temporal features of the sound data and the timing information is computed as a cross-correlation of the weights for different frames in the sound data generated from the first sound signal;
   estimating parameters for the features and timing information of the sound data of the first sound signal;
   processing sound data generated from a second sound signal to identify second features and second timing information that are within the estimated parameters from the sound data generated from the first sound signal;
   extracting the identified features of the sound data from the first sound signal;
   inserting the extracted identified features of the first sound signal into the second sound signal based on the second features and second timing information of the second sound signal, the inserting effective to provide altered second sound data; and
   producing the altered second sound signal with the extracted identified features of the first sound signal.

8. One or more computer-readable and non-transitory storage media as described in claim 7, wherein the identifying of the second features from the second sound signal is performed iteratively by estimating a new set of weights for the second features of the sound data generated from the second sound signal.

9. One or more computer-readable and non-transitory storage media as described in claim 7, the instructions further comprising modifying portions of the sound data for the first or second sound signals by stretching or compressing the first or second sound signal.

10. The method of claim 1, wherein the bases that describe spectral characteristics further comprise spectral basis vectors that are building blocks of the first and second sound data.

11. The method of claim 10, wherein the weights that describe temporal features of the first and second sound data define a temporal evolution of a signal such that at each instance of the signal, the signal may be defined by a linear combination of the spectral basis vectors.

12. The method of claim 1, wherein the features and the second features further comprise speech bases and speech weights that describe vocal characteristics of spoken sound in the first and second sound data, respectively.

13. The method of claim 1, wherein the features and the second features further comprise noise bases and noise weights that describe background noise in the first and second sound data, respectively.

14. The system of claim 4, further comprising a parameter module implemented at least partially in hardware, the parameter module configured to estimate the set of parameters for the features and timing information identified in the first sound signal and to pass the set of parameters to the extraction module.

15. The method of claim 1, the method further comprising modifying the extracted identified features of the first sound data to match the timing information of the identified second features of the second sound data prior to inserting into the second sound data.

16. The method of claim 15, the modifying comprising stretching, compressing, warping, or shifting.

17. The method of claim 4, the at least one extraction module further configured to modify the extracted identified features of the sound data from the first sound signal to match the timing information of the identified features of the second sound signal prior to inserting into the second sound signal.

18. The method of claim 17, the at least one extraction module configured to modify the extracted features of the first sound signal by stretching, compressing, warping, or shifting.

19. One or more computer-readable storage media as described in claim 7, the instructions further comprising modifying the extracted identified features of the first sound signal to match the timing information of the identified second features of the second sound signal prior to inserting into the second sound data.

20. The method of claim 19, the modifying comprising stretching, compressing, warping, or shifting.

* * * * *